(12) United States Patent
Bernards et al.

(10) Patent No.: US 6,280,838 B1
(45) Date of Patent: *Aug. 28, 2001

(54) OPTICAL ELEMENT, A DISPLAY DEVICE PROVIDED WITH SAID OPTICAL ELEMENT, AND A METHOD OF MANUFACTURING THE OPTICAL ELEMENT

(75) Inventors: Thomas N. M. Bernards, Eindhoven (NL); Marijke M. E. Severin-Vantilt, St. Cyr au Mont d'Or (FR); Ingrid J. M. Snijkers-Hendrickx, Eindhoven; Gerardus H. Rietjens, Stamproy, both of (NL)

(73) Assignee: U. S. Philips Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/003,043

(22) Filed: Jan. 5, 1998

(30) Foreign Application Priority Data

Jan. 10, 1997 (EP) ................................................. 97200067

(51) Int. Cl.⁷ .................................................. B32B 18/00
(52) U.S. Cl. ......................... 428/325; 428/329; 428/331; 428/336; 428/446; 428/447; 428/913
(58) Field of Search ................................... 428/195, 204, 428/206, 212, 328, 329, 323, 331, 335–336, 428–429, 325, 451, 446, 447, 913; 359/452; 313/478–479

(56) References Cited

U.S. PATENT DOCUMENTS

| | | | |
|---|---|---|---|
| 2,404,357 | * 7/1946 | Bechtold .............................. | 428/336 |
| 3,429,846 | * 2/1969 | Bechtold et al. ..................... | 524/389 |
| 3,955,035 | * 5/1976 | Ito et al. .............................. | 428/334 |
| 4,211,823 | * 7/1980 | Suzuki et al. ........................ | 428/412 |
| 4,556,605 | * 12/1985 | Mogami et al. ..................... | 428/331 |
| 4,590,117 | * 5/1986 | Taniguchi et al. ................... | 428/212 |
| 4,685,783 | 8/1987 | Heller et al. ......................... | 351/163 |
| 5,015,523 | * 5/1991 | Kawashima et al. ................ | 428/336 |
| 5,462,806 | * 10/1995 | Konishi et al. ...................... | 428/451 |
| 5,869,129 | * 2/1999 | Aben et al. ............................ | 427/64 |
| 5,905,336 | * 5/1999 | Van Hal et al. ..................... | 313/497 |
| 6,025,037 | * 2/2000 | Wadman et al. ..................... | 427/554 |

FOREIGN PATENT DOCUMENTS

WO9616428   5/1996   (WO) ............................. H01J/29/89

* cited by examiner

Primary Examiner—Bruce H. Hess
Assistant Examiner—B. Shewareged
(74) Attorney, Agent, or Firm—Norman N. Spain

(57) ABSTRACT

An optical element comprising a substrate which is provided with a transparent coating (9) containing a photochromic material, the transmission of said optical element varying in the visible region in response to a variation in light. The optical element is characterized in that the coating (9) comprises an inorganic network of a silicon oxide and an organic polymer which is chemically bonded to the inorganic network via Si—C bonds. Preferably, also macroscopic particles of a metal oxide are incorporated in the network, the metal preferably being selected from the group formed by Al, Si, Ti, Zr, In and Sn. Preferably, metal-oxide particles are used whose size is above 5 nm. Such photochromic coatings (9) are scratch-resistant and demonstrate a good switching behavior. The coatings are used, for example, on display windows (3) of display devices (1) and on sunglasses. Methods of manufacturing said layers are described.

8 Claims, 3 Drawing Sheets

OPTICAL ELEMENT, A DISPLAY DEVICE PROVIDED WITH SAID OPTICAL ELEMENT, AND A METHOD OF MANUFACTURING THE OPTICAL ELEMENT

The invention relates to an optical element comprising a substrate provided with a transparent coating containing a photochromic material, the transmission of said optical element in the visible region varying in response to a variation in light.

The invention also relates to a display device provided with a display window which serves as the substrate for the optical element.

The invention further relates to a method of manufacturing an optical element comprising a substrate provided with a transparent coating containing a photochromic material, the transmission of said optical element in the visible region varying in response to a variation in light.

Optical elements for varying the transmission of light are used to influence the transmission and/or reflection of (visible) light, for example, of lamps, rear-view mirrors and sunroofs of cars, or of windows for buildings ("smart windows") or of spectacle lenses. Said optical elements are also used at the viewing side of display windows of (flat) display devices, such as cathode ray tubes (CRTs), plasma-display panels (PDPs) and liquid-crystal display devices (LCDs, LC-TVs and plasma-addressed LCDs) to improve the contrast of the image reproduced. By virtue thereof, it is not necessary to change the glass composition of the display window, and the possibilities of bringing the light transmission to a desired value in a simple manner are increased.

The transparent coatings mentioned in the opening paragraph influence the intensity of both the reflected ambient light and the light originating from an (internal) light source, for example the phosphors in a CRT. The incident ambient light passes through the coating and is reflected at the substrate (for example at the CRT phosphors or color filters), whereafter the reflected light again traverses the coating. If the transmission of the coating is T, then the intensity of the reflected ambient light decreases by a factor of $T^2$. However, the light originating from the internal light source(s) traverses the transparent coating only once, so that the intensity of this light decreases only by a factor of T. The combination of these effects causes an increase of the contrast by a factor of $T^{-1}$.

Examples of optical elements for varying the transmission of light include, inter alia, electrochromic elements and photochromic elements.

The transmission of an optical element comprising a transparent coating with a photochromic material, hereinafter referred to as photochromic element, varies (automatically) as a result of electromagnetic radiation, for example light, such as sunlight, which is directly or indirectly incident on the coating. A large number of photochromic materials are known, and they can be subdivided into various classes (for example spiro-pyrans, spiro-oxazines or fulgides). Such an optical element enables, for example, the contrast of a (luminescent) image to be increased by applying a photochromic coating to the display window of a display device, the local transmission of the coating in the visible region being governed by the radiation which is (locally) incident on the coating. Such an optical element can also be provided on the lenses of sunglasses to reduce the transmission of (sun)light, so that disturbing radiation (blinding) and/or (UV-)radiation in the light, which is detrimental to the eye, can be reduced, while, at the same time, good vision is achieved.

An optical element of the type mentioned in the opening paragraph is known from European Patent Application EP-A 740845 (PHN 15.083, U.S. Ser. No. 08/548,936). The photochromic element described in said Patent Application is provided on a display window of a display device, and comprises a selectively transparent coating whose transmission decreases automatically as the intensity of the incident radiation increases, and is (preferably) governed by (electromagnetic) radiation incident on the coating and having a wavelength outside the region in which the display device emits light (for example (ambient) light in the so-called UV-A region).

A disadvantage of the known optical element is that, in general, the applicability of the above-described photochromic coatings is limited.

Therefore, it is an object of the invention to provide, inter alia, an optical element of the type mentioned in the opening paragraph, which has a wider applicability. The invention further aims at providing a simple method of manufacturing such optical elements.

To this end, the optical element in accordance with the invention is characterized in that the coating comprises an inorganic network of a silicon oxide, and in that the coating also contains an organic polymer which is chemically bonded to the inorganic network via Si—C bonds.

The invention is based on the insight that the photochromic material in the transparent coating is incorporated in a combination of an inorganic network and an organic polymeric network, that is, a so-called hybrid network comprising silicon oxide and organic (carbon-containing) polymers. By incorporating the photochromic material in such a hybrid network, a photochromic coating is obtained which demonstrates a good switching behavior and which is scratch-resistant. In the known optical element, the photochromic material is incorporated in a (purely) organic network. In such networks, the photochromic material demonstrates a good switching behavior. However, these organic polymers have a poor mechanical strength (hardness, resistance to wear and scratch resistance). If the photochromic material is incorporated in a (purely) inorganic network, in general, two types of problems occur. On the one hand, there is the phenomenon that, as soon as the photochromic material is incorporated in an inorganic network, the photochromic effect becomes inverted, i.e. under the influence of light, the normal transition from (colorless) transparent to colored (for example color-neutral grey) changes to a reduction of the color of the photochromic material under the influence of light (the so-called "bleaching"), which is undesirable. On the other hand, once the photochromic material is incorporated in the purely inorganic network, a reduction or even (substantial) absence of the photochromic effect is often observed.

By incorporating the photochromic material in the hybrid network comprising a silicon oxide and polymers, a photochromic coating having the desired physical and chemical properties is achieved, in particular as regards the preservation of the switching behavior of the photochromic material. In addition, a mechanically strong and thermally stable coating is obtained having the desired density and mechanical strength (hardness, resistance to wear and scratch resistance). The hybrid network has such flexibility that the photochromic material has sufficient space for switching, whereas a purely inorganic network often is too compact and/or too tight, so that a photochromic material incorporated in such a network has insufficient possibilities (for example as a result of steric hindrance) of undergoing the (reversible)(chemical) structural changes necessary for the photochromic effect. By way of example of such a structural change, the photochromic act of a spiro-pyran comprises the heterolytic opening of the spiro C—O bond. By incorporating the photochromic material in a coating in accordance with the invention, an optical element having a good photochromic effect and the desired mechanical properties is obtained.

Photochromic coatings in accordance with the invention are used, for example, to improve the contrast of display windows of display devices, which coatings are sensitive to (sun)light which is directly incident on the display window provided with the electrochromic element as well as to (ambient) light or (sun)light which is incident on the coating via (double)(window)glass. Another field of application relates to providing lenses of sunglasses with a photochromic coating in accordance with the invention. The use of such coatings leads to a properly switching photochromic system, which also functions if the sunglasses are used in a vehicle (car), i.e. behind glass, while the sun is, for example, low on the horizon (little UV-radiation). In this manner, the road-user's safety is improved. By virtue of the improved mechanical properties of the photochromic coatings in accordance with the invention, an additional scratch-resistant coating on the photochromic coating can be dispensed with.

An embodiment of the optical element in accordance with the invention is characterized in that also microscopic particles of a metal oxide are incorporated in the (hybrid) network. Preferably, the metal in the metal oxide is selected from the group formed by Al, Si, Ti, Zr, In and Sn. By virtue thereof, the flexibility of the hybrid network is further improved. Another effect of the incorporation of microscopic metal-oxide particles in the hybrid network is that it enables relatively thick coatings to be manufactured.

A preferred embodiment of the optical element in accordance with the A invention is characterized in that the metal oxide contains a silicon(di)oxide or a titanium(di)oxide. If the same material is used for the metal-oxide particles and the inorganic network, then the optical properties of the coating will generally remain the same if the concentration of the metal-oxide particles in the coating changes. If the density of the network in the coating is lower than that of pure silicon oxide, the refractive index of the coating may be lower than that of pure silicon oxide. Further, for the manufacture of coatings comprising metal-oxide particles, in particular $SiO_2$, a plurality of suspensions containing particles having accurately determined diameters are commercially available at an attractive price.

The refractive index of titanium(di)oxide is higher than that of silicon(di)oxide, so that, when microscopic $TiO_2$ particles are incorporated in a (hybrid) network comprising $SiO_2$ and polymers, it is possible to adjust the refractive index of the coating to a desired value. If the optical element further comprises, for example a (two-layer or multilayer) anti-reflective coating, such a coating of $TiO_2$ particles serves in a (hybrid) network comprising $SiO_2$ and polymers as (one of) the high-refraction layer(s) of the anti-reflective coating.

By incorporating, in the (hybrid) network, microscopic particles of a metal oxide containing a metal other than silicon or titanium, such as Al, Zr, In and Sn, the properties of the coating are influenced (for example the refractive index of the coating if use is made of Al or Zr, and, for example, the conductivity of the coating if use is made of In or Sn).

A further embodiment of the optical element in accordance with the invention is characterized in that the fraction by volume of the microscopic particles in the coating ranges from 1 to 35%. The desired properties of the transparent coating (for example the density, the flexibility of the network, the mechanical strength (hardness, resistance to wear, scratch resistance), the refractive index, the electric conductivity, the switching behavior of the photochromic material, etc.) are also influenced by the concentration of the, microscopic particles in the hybrid network. If the concentration of microscopic particles is too low (below 0.3 vol. %, microscopic particles), such particles contribute only slightly to the desired flexibility of the hybrid network. The incorporation of small concentrations of metal oxides in the network (for example the incorporation of 1.5 vol. %, microscopic $TiO_2$ particles) causes the photochromic material in the transparent coating to react in a sufficiently sensitive manner to the electromagnetic radiation incident on the coating, so that the optical element exhibits the desired switching behavior. The incorporation of more than 35 vol. % microscopic particles in the hybrid network generally leads to a highly agglomerated network, which adversely affects the desired mechanical properties of the coating. The incorporation, for example, of 15–20 vol. % microscopic $SiO_2$ particles in the network leads to an optical element having a mechanically strong and thermally stable coating, which optical element further demonstrates the desired switching behavior.

Preferably, the size of the, microscopic metal-oxide particles is above 5 nm. Preferably, the size of the, microscopic metal-oxide particles is below 200 nm. Microscopic particles having an average size (diameter) above approximately 200 nm generally cause a certain degree of light scattering in the photochromic element. Diffuse scattering is brought about by incorporating, microscopic (metal-oxide) particles of the desired diameter (order of magnitude of the wavelength of visible light) in the transparent coating. If the, microscopic particles are too small (smaller than approximately 5 nm), they contribute only little to the desired flexibility of the hybrid network and hence to the improvement of the photochromic effect of the coating. ($SiO_2$) particles having an average diameter of approximately 20 nm, which are incorporated in a (hybrid) network comprising silicon oxide and polymers, constitute very suitable, (microscopic) particles.

The coating in accordance with the invention is a hybrid material and contains, apart from the inorganic network of silicon(di)oxide, an organic (carbon-containing) polymeric component. Certain C-atoms of the polymer are chemically bonded to Si-atoms of the inorganic network. The carbon-containing polymeric chains are intertwined with the inorganic network and form a hybrid network therewith. The chemical bond between the polymeric component and the inorganic network results in mechanically strong and thermally stable coatings. By virtue of the polymeric component in the silicon-oxide network, relatively thick coatings up to 50 $\mu$m can be manufactured without crack-formation (crackles) in the layers. The bonding between the coating and the substrate (customarily a glass surface) is very good.

Polyether, polyacrylate and polyvinyl are examples of organic polymeric components. By adding these polymers, the coating becomes a hybrid inorganic-organic material and comprises, apart from the inorganic network of silicon oxide, an organic polymeric component.

For use in (display windows of) display devices or sunglasses, which generally comprise a glass substrate, coatings are manufactured in thicknesses ranging from 0.5 $\mu$m to 20 $\mu$m. In such relatively thick layers, a relatively large quantity of photochromic material can be dissolved or incorporated, so that, if the photochromic material is in the colored state, the transmission of the layers can be low, also if light (which is disturbing or detrimental to the eye) is incident with a relatively high intensity on (a part of) the optical element provided on a substrate (display window or spectacle lens). Such photochromic coatings generally are also sensitive to (ambient) light or (sun)light which is incident on the coating, also if this occurs via (double) window glass. The use of such relatively thick coatings renders a time-consuming fine-polishing treatment of the glass surface of the substrate superfluous. Further, to optimize the effect, the refractive index of the coating can be adapted to that of the glass of the substrate. The refractive index of the coating can be varied between 1.42 and 1.60. In general, an increase of the concentration of metal oxides in the coating leads (depending on the type) to an increase of the refractive index, while an increase of the quantity of the polymeric component leads to a reduction of the refractive index of the coating.

The object of providing a simple method of manufacturing an optical element comprising a substrate provided with a transparent coating containing a photochromic material is achieved by a method of the type described in the opening paragraph, which method is characterized in that the substrate is provided with a solution containing an alkoxysilane of the formula

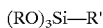

wherein R is an alkyl group and R' is an organic group which is chemically bonded, via an Si—C bond, to the Si-atom of the alkoxy-silane, which solution further comprises water and the photochromic material, whereafter the coating is formed by means of a thermal treatment. Such a coating comprises an inorganic network of silicon oxide, which network is chemically bonded to and intertwined with the particles of the suspension via Si—O bonds.

In general, such optical elements comprising a photochromic material are manufactured via the so-called wet-chemical sol-gel route. A sol-gel process is a process in which by the (controlled) addition of water, a solution of alkoxysilane in alcohol, in succession, hydrolyzes (homogeneously) and (poly)condenses, thereby forming a (porous) inorganic network of silicon(di)oxide. The inorganic network is densified by subjecting it to a thermal treatment, in which the formation of the silicon oxide is completed.

During the sol-gel process, a three-dimensional inorganic network is formed. The R-group is preferably a $C_1$–$C_5$ alkyl group. The tri-alkoxysilane contains one polymerizable R'-group which is chemically bonded to the Si-atom via an Si—C bond. In general, modified silanes are used as the starting material for polymerization. A modified silane is to be understood to mean an alkoxysilane $[(RO)_4Si]$, for example tetra-ethoxysilane (TEOS) or tetra-methoxysilane (TMOS), with one or more of the alkoxy groups [RO] being replaced by an organic group, and the coupling between the inorganic part and the organic part of the molecule forming an Si—C bond, which Si—C bond generally does not hydrolyze during the standard sol-gel processes. The epoxy group, the methacryloxy group, the vinyl group and the mercapto group are examples of suitable polymerizable R'-groups. Suitable examples of alkoxysilanes, with polymerizable R'-groups include 3-glycidyloxy-propyl-tri-methoxysilane, 3-methacryloxy-propyl-tri-methoxysilane, vinyl-tri-ethoxysilane, methyl-tri-methoxysilane and mercapto-propyl-tri-methoxysilane.

During the sol-gel process, the alkoxysilanes hydrolyze and condense to form an inorganic network of silicon oxide. Further polymerization generally takes place at a higher temperature (for example 80° C.), at which temperature the carbon-containing polymerizable groups form polymeric chains which are chemically bonded to the inorganic network via Si—C bonds. The epoxy groups polymerize to form a polyether, while the methacryloxy groups and the vinyl groups polymerize to form, respectively, a polymethacrylate and a polyvinyl. To thermally polymerize the epoxy groups, an amine compound or a metal-alkoxide (for example Ti-alkoxide, Zr-alkoxide or Al-alkoxide) may be added to the solution as a catalyst. To polymerize the methacryloxy groups, the layer is exposed to UV-light, while mercaptosilane is added to the vinyl groups. It is noted that the methylgroup of the methyl-trimethoxysilane does not contribute to the organic polymerization.

An embodiment of the method in accordance with the invention is characterized in that the solution further comprises a suspension of particles of a metal oxide. Preferably, the metal in the metal oxide is selected from the group formed by Al, Si, Ti, Zr, In and Sn. The advantage of the incorporation of microscopic particles of the metal oxide in the hybrid network is that, in the manufacture of the coating, the temperature remains so low during the thermal treatment that the photochromic properties of the photochromic material are not adversely affected, while a network having the desired physical and chemical properties (for example density, flexibility, mechanical strength and refractive index) is achieved. The photochromic coatings thus formed are generally sensitive to (ambient) light or (sun)light which is incident on the coating, also if it is incident via (double) (window) glass. Further, the photochromic properties are generally preserved if the thermal treatment is carried out at a temperature below 200° C. Preferably, the temperatures during the thermal treatment range from 80 to 160° C.

The suspension preferably comprises microscopic metal-oxide particles whose size ranges from 5 to 200 nm.

An embodiment of the method in accordance with the invention is characterized in that the metal oxide contains $SiO_2$ particles or $TiO_2$ particles. The advantage of using a suspension containing silicon(di)oxide is that such suspensions have long keeping properties (months). Besides, for the manufacture of the coatings comprising metal-oxide particles, particularly $SiO_2$, a plurality of suspensions having a relatively high solids content and, further, comprising particles having accurately defined diameters are commercially available at an attractive price. By using such $SiO_2$ suspensions, a network having a high solids content is obtained. The refractive index of titania is higher than that of silicon(di)oxide, as a result of which, during the incorporation of microscopic $TiO_2$ particles in a (hybrid) network comprising $SiO_2$ and organic (carbon-containing) polymers, it is possible to manufacture a coating whose refractive index is adjusted to a desired value. In this manner, it is also possible to manufacture a (two-layer or multilayer) anti-reflective coating.

These and other aspects of the invention will be apparent from and elucidated with reference to the embodiments described hereinafter.

Figure 3A:
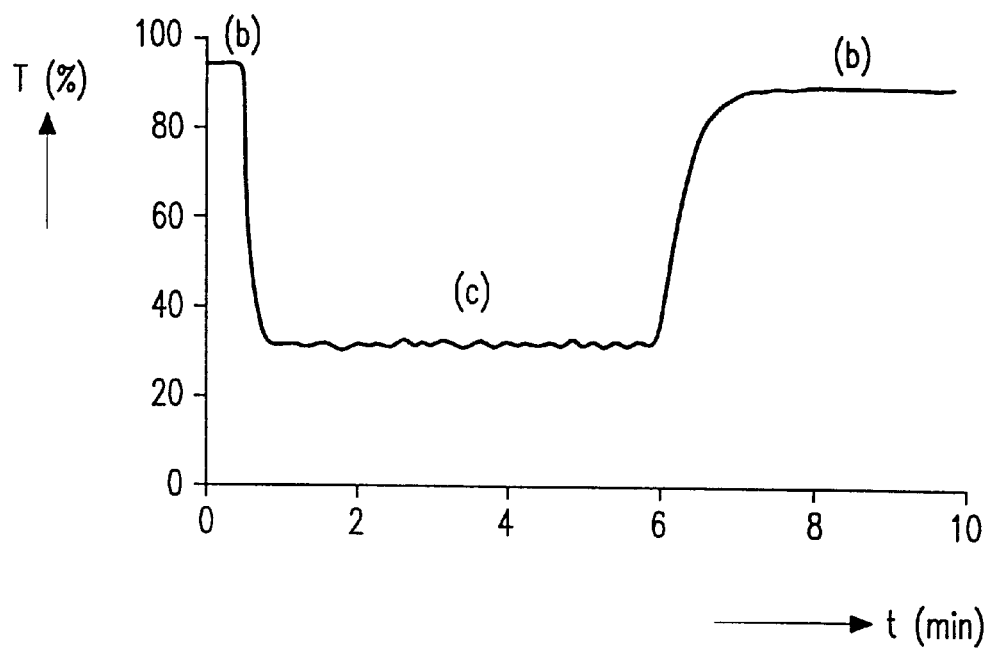
Figure 3B:
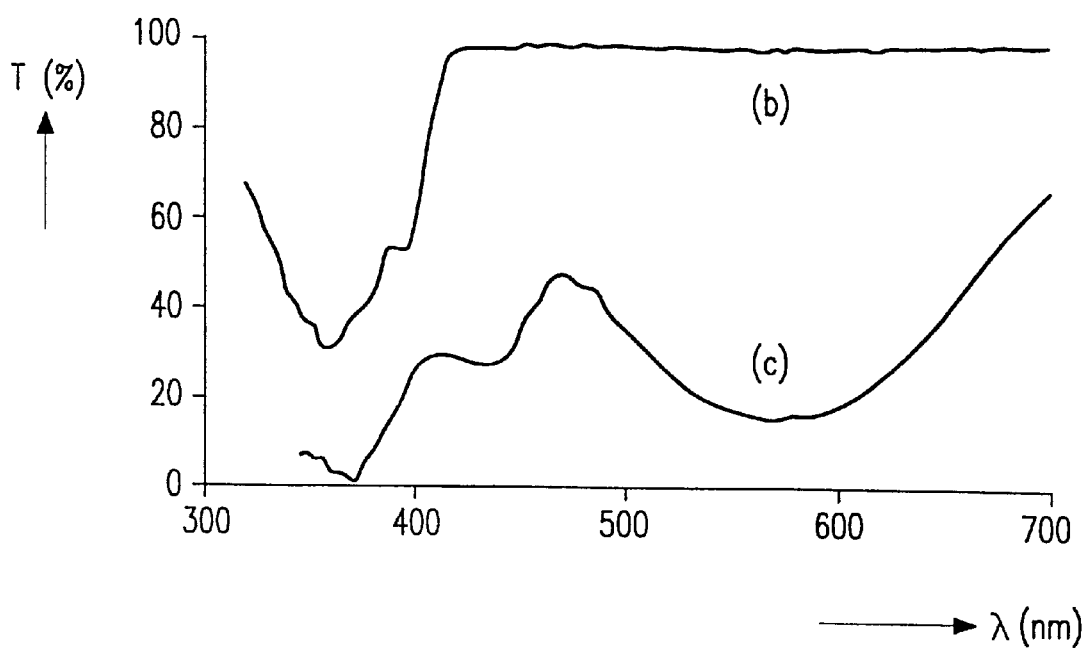

FIG. 3A shows the transmission T as a function of time of a transparent coating comprising a photochromic material which is incorporated in a hybrid network in accordance with the invention, and FIG. 3B shows the transmission T as a function of the wavelength λ of the light of a transparent coating comprising a photochromic material which is incorporated in a hybrid network in accordance with the invention.

The Figures are purely schematic and not drawn to scale. In particular for clarity, some dimensions are exaggerated strongly. In the Figures, like reference numerals refer to like parts, whenever possible.

Figure 1A:
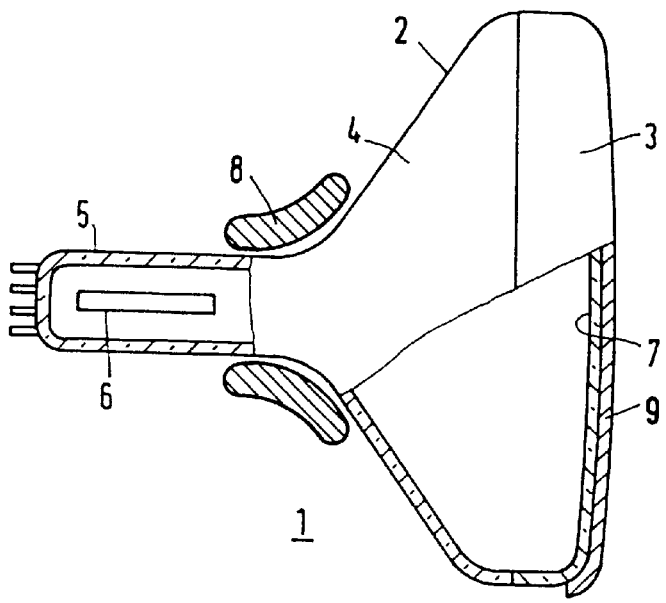
FIG. 1A is a partly cut-away view of a display device having a cathode ray tube with a display window provided with a coating in accordance with the invention.

FIG. 1A is a schematic, cut-away view of a display device comprising a cathode ray tube (CRT) 1 with a glass envelope 2 including a display window 3, a cone 4 and a neck 5. In the neck there is arranged an electron gun 6 for generating one or more electron beams. Said electron beam(s) is (are) focused on a phosphor layer 7 at the inner surface of the display window 3. The electron beam(s) is (are) deflected across the display window 3 in two mutually perpendicular directions by means of a deflection coil system 8. The outer surface of the display window 3 is provided with a transparent coating 9. In an alternative embodiment, the transparent coating is provided on a so-called (flat) front panel, which is positioned on the outside of the display device in front of the display window.

Such coatings can also be used on the viewing side of display windows of other (flat) display devices, such as plasma-display panels (PDPs) and liquid-crystal display devices (LCDs, LC-TVs and plasma-addressed LCDs) to improve the contrast of the image reproduced.

Figure 1B:
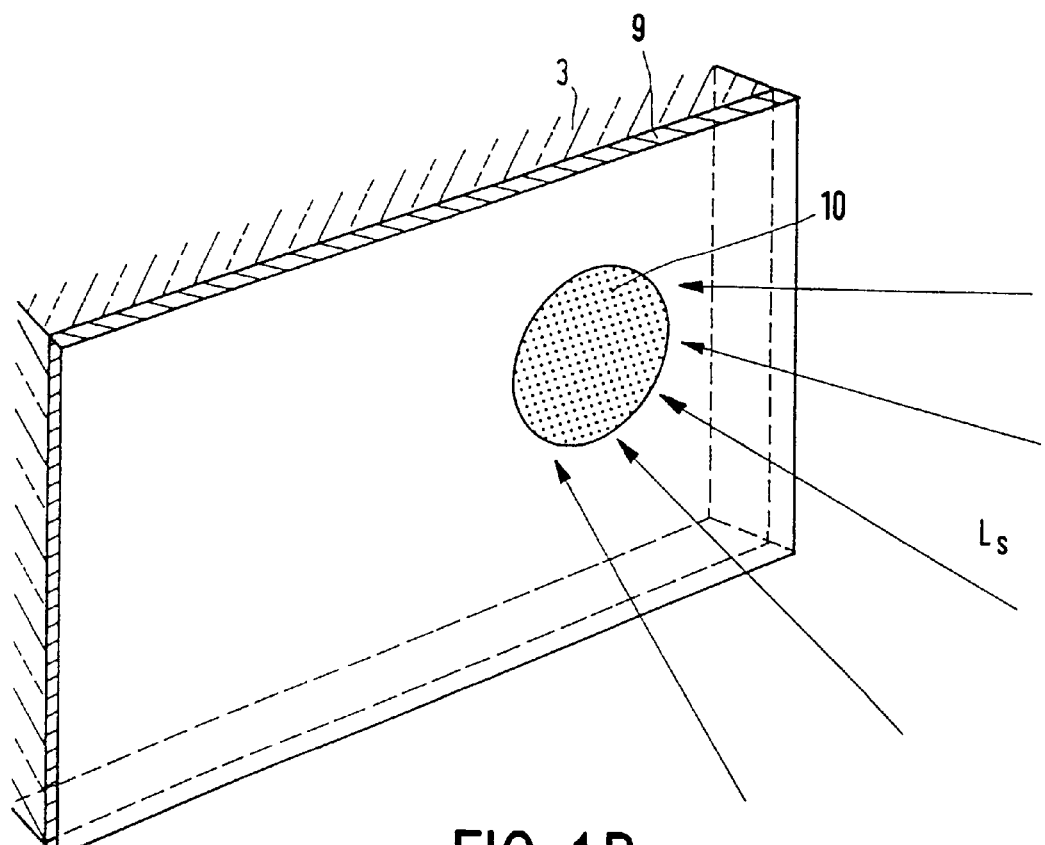
FIG. 1B is a view of the display window of the display device provided with a coating in accordance with the invention.

FIG. 1B is a schematic view of the front side of a display device, with the outer surface of display window 3 being provided with a coating 9 in accordance with the invention. A light spot 10 originating from the surroundings of the display device is incident on a part of the display window. Radiation $L_s$, which causes the light spot 10, may originate, for example, from sunlight entering (in)directly through one or more window glasses or otherwise, and being incident on a part of the display window 3. Said light spot 10 may also originate from another radiation source in the vicinity of the display device, for example a lamp. In FIG. 1B, a circular light spot 10 is shown. Said light spot 10, however, may have any shape and be incident on a part of the display window or on the entire display window of the display device. The light spot 10 may also comprise a number of light spots. In particular, the intensity of light spot 10 may be different at different locations on the display window 3.

Due to the intensity of the light spot 10, the contrast of the image reproduced on the display window of the display device is reduced (substantially) at the location of the light spot 10. One of the properties of the transparent coating 9 is that the transmission of the coating decreases automatically at the location of the light spot 10 when the intensity of the light in the light spot 10 increases, so that the contrast of the display device is increased at the location of said light spot 10. Another property of the transparent coating 9 is that the transmission of the coating increases automatically (again) at the location of the light spot when the intensity of the light of the light spot 10 decreases (again) or when the light spot on the display window disappears. In general, the transparent coating reacts in a reversible manner to variations in the light intensity of (ambient) light incident on the coating.

The solution is applied to the display window by means of customary techniques, such as spraying or atomizing. Preferably, the (alcoholic) solution is spin-coated onto the display window. After drying and heating, for example, to 80° C. for 60 minutes or, for example, to 160° C. for 30 minutes, a mechanically strong, smooth and mirror-bright filter layer having the desired electrical and transparent properties is achieved.

By means of the invention, transparent coatings having a thickness of at least 0.5 μm and a transmission which varies as a function of the (ambient) light which is locally incident on the coating can be provided, in a simple manner, on, for example, a display window of a display device or on the lenses of sunglasses. The relatively thick layers do not exhibit crackles. The coating can be produced so as to be mirror-bright, even if, prior to the application of the coating, the substrate has a matt appearance with an average roughness $R_a$ of 0.13 μm. The average roughness $R_a$ of the coated substrate is 0.03 μm. The coatings are lightfast and resistant to customary cleaning liquids. Curing of the filter layer at 160° C., which is a temperature to which the photochromic material is resistant, results in layers which are scratch-resistant and resistant to wear.

Figure 2:
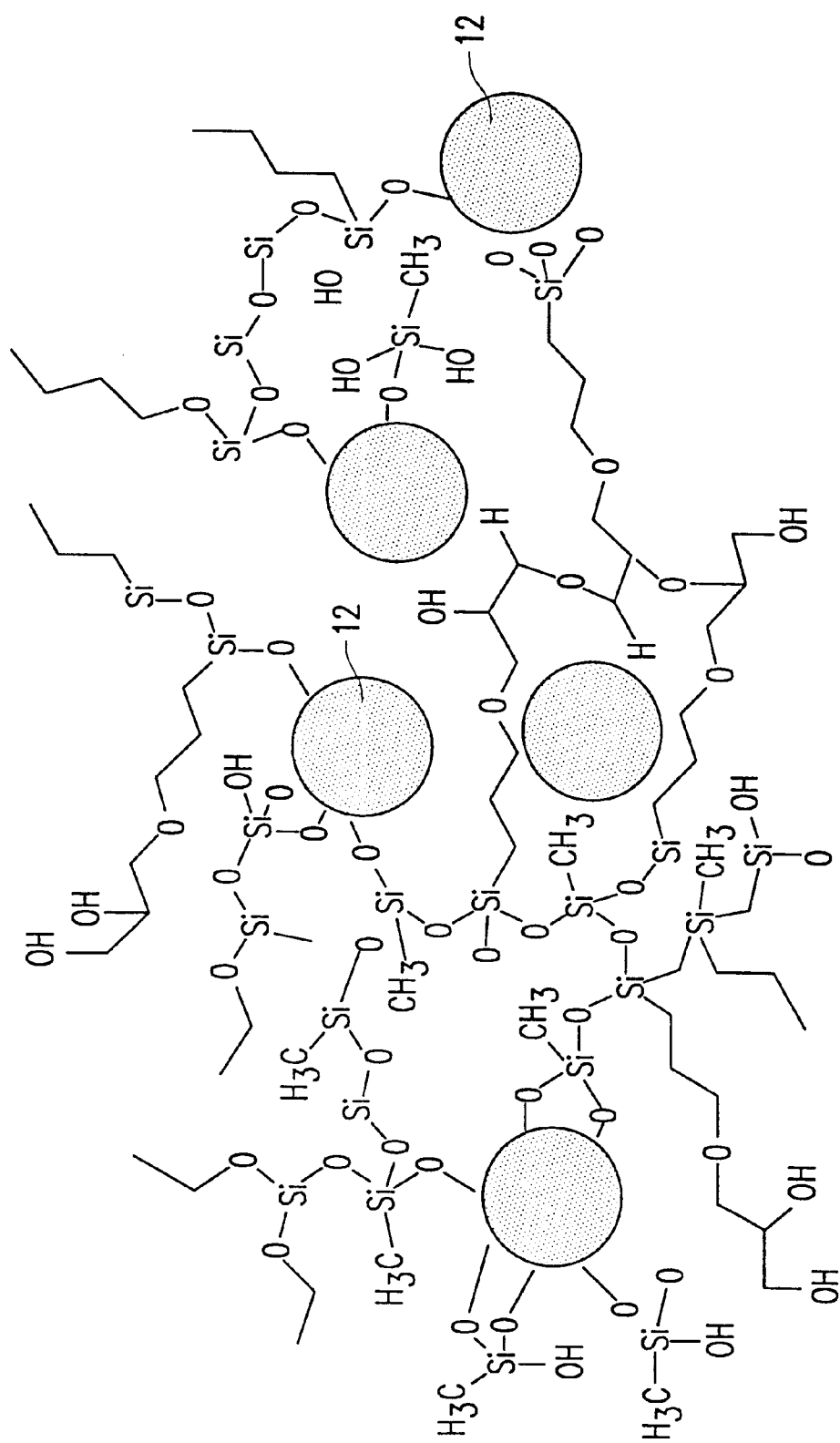
FIG. 2 is a very schematic, "artist's impression" of a hybrid network in accordance with the invention, which comprises silicon oxide and polymers in which microscopic metal-oxide particles are incorporated.

FIG. 2 is a very schematic "artist's impression" of a part of a combination of an inorganic network and a polymeric network, i.e. a part of a so-called hybrid network in accordance with the invention comprising a silicon oxide and organic polymers, in which hybrid network also microscopic particles 12 of the metal oxide are incorporated. In FIG. 2, atoms are indicated in the customary manner, i.e. silicon atoms are indicated by "Si", oxygen-atoms are indicated by "O", hydrogen atoms are indicated by "H", while kinks in the chains (chemical bonds) between the atoms represent $CH_2$-groups. FIG. 2 shows that there are network-sections which are entirely composed of compounds of the type —O—Si—O— (purely inorganic network) and parts in which long organic (carbon-containing) polymeric chains of the type —$CH_2$—$CH_2$—$CH_2$— alternate with chains of the type —$CH_2$—O—$CH_2$—. The organic polymeric chains are intertwined with the inorganic $SiO_2$ network so as to form the hybrid network. The chemical bond between the polymeric component and the inorganic network results in mechanically strong and thermally stable coatings. The microscopic particles 12 form part of the (hybrid) network, which, via Si—O bonds, is chemically bonded to and intertwined with the microscopic particles 12. It is not necessary for all microscopic metal particles to be bonded to the hybrid network. In general, the photochromic material is not chemically bonded to the hybrid network.

By incorporating the photochromic material in such a hybrid network, a photochromic coating is obtained which has a good switching behavior, which is mechanically strong and thermally stable and which has the desired density and mechanical strength (hardness, resistance to wear and scratch resistance).

Preferably, the transmission of coating 9 is substantially independent of radiation visible to the human eye, i.e. outside the wavelength range from ~400 nm to ~780 nm. A further, particular embodiment of the optical element in accordance with the invention is characterized in that the transmission of the layer in the so-called spectral region changes as a result of radiation which is incident on the layer and which has a wavelength in the range from 300 to 400 nm, preferably in the range from 350 to 380 nm. In this manner, it is precluded that the transmission of the coating is influenced by both radiation from the visible region and infrared radiation originating, for example, from a heat source in the vicinity of the coating.

Preferably, there is a lower limit to the transmission of the coating, i.e. if the intensity of the radiation incident on the layer exceeds a certain limiting value, a further increase of the absorption of the coating does not take place. A particular embodiment of the optical element is characterized in that the minimum transmission of the coating is 20%. Another desirable property of the coating is that the period of time in which the transmission of the coating changes as a result of a change in the intensity of the incident radiation is less than 5 minutes, preferably less than 1 minute. In addition, small changes in the intensity of the radiation incident on the coating do not necessarily have to cause a change in the transmission of the coating. A particular embodiment of the optical element in accordance with the invention is characterized in that the coating is insensitive to light-intensities below 100 lux. The standard employed in this respect is that the average light intensity in a room is approximately 100 lux.

From the relevant literature a large number of photochromic materials is known, which can be subdivided into various classes. A particular embodiment of the optical element is characterized in that the coating comprises at least a substance selected from the classes formed by the spiro-pyrans, spiro-oxazines or fulgides. An example of a photochromic material which belongs to the class of the spiro-pyrans is 6-nitro-8-methoxy-1',3',3'-tri-methyl-spiro[2H-1]benzo-pyran-2,2'-indoline. An example of a photochromic material belonging to the class of the spiro-oxazines is 1,3,3-tri-methyl-spiro{indoline-2,3'-[3H]napth[2,1-b][1,4]oxazine}. A large number of photochromic fulgides are disclosed in U.S. Pat. No. 4,685,783. This class of fulgide materials has a high quantum efficiency in the near-ultraviolet region, a low quantum efficiency for discoloration caused by visible light and a fast rate of thermal discoloration at ambient temperatures, yet not so fast that the combination of discoloration caused by white light and thermal discoloration precludes the desired coloration as a result of the ultraviolet component of fierce sunlight from happening.

FIG. 3A shows the transmission T, in relative units (%) as a function of time (min.), of a transparent coating comprising a photochromic material which is incorporated in a hybrid network in accordance with the invention. Said photochromic material comprises a spiro-pyran with two transmission states: a bleached state (indicated by the letter "b") and a colored state (indicated by the letter "c").

FIG. 3B shows the transmission T, in relative units (%) as a function of the wavelength $\lambda$ (nm) of the light, of a transparent coating comprising a photochromic material as shown in FIG. 3A, which is incorporated in the hybrid network in accordance with the invention.

Photochromic materials are generally incorporated in purely organic networks. In these polymeric matrices, they have sufficient freedom of movement (flexibility) to break open under the influence of (UV) light and assume a different color state. Such purely organic networks are difficult to provide on display windows of display devices or on spectacle lenses because of the relatively poor adhesion between the organic polymer and the substrate. When use is made of a hybrid network in accordance with the invention, which comprises a combination of an inorganic network and an organic polymer, in particular the inorganic part of the hybrid network contributes to the adhesion to the (glass) substrate, while the organic polymer chains provide for the necessary flexibility of the network. By the incorporation of photochromic materials in the hybrid network in accordance with the invention, a switching behavior of the photochromic material is achieved which is just as good as the switching behavior in the known polymeric networks, while, in addition, the mechanical properties of the layer are considerably improved. By the incorporation in the hybrid network of microscopic particles of a metal oxide, the flexibility of the photochromic element is further improved and, in the manufacture of the layer, the temperature can remain so low during a thermal treatment (below 200° C., preferably in the range from 80 to 160° C.) that the photochromic properties are not adversely affected, while, in spite of said low temperature, the layer still acquires all the physical and chemical properties desired. In addition, it has been found that coating-liquids based on metal-oxide particles and modified silanes (alkoxysilanes with polymerizable R'-groups, such as glycidyloxy-propyl-tri-methoxysilane, methacryloxy-propyl-tri-methoxysilane, vinyl-tri-ethoxysilane, methyl-tri-methoxysilane, and mercapto-propyl-tri-methoxysilane) in which the photochromic material is dissolved, exhibit a better durability at room temperature (several days) than the known coating-liquids.

The inventors have further recognized that it is desirable that the transmission of the layer should change gradually in said spectral region. If the transmission of the layer changes insufficiently gradually in said spectral region, for example the spectral region in which the electroluminescent phosphors of a display device emit, color effects will occur, which are generally undesirable. A suitable combination of two or more photochromic materials, for example photochromic fulgides, as disclosed in U.S. Pat. No. 4,685,783, can bring about, under all conditions, a layer having a color-neutral transmission throughout the desired spectral region.

EXAMPLE 1

A solution is prepared, which comprises:
  30 g methyl-tri-methoxysilane (M=136),
  30 g 3-glycidyloxy-propyl-tri-methoxysilane (M=236),
  15 g acetic acid (100%, M=60).
The following substance is stirred into this mixture:
  60 g of a colloidal silica suspension of 50 wt. % $SiO_2$ in water (pH=9, particle size 20 nm) (Ludox™ TM-50).
The preparation of this basic lacquer takes approximately 15 minutes.
A further solution is prepared:
  5 g photochromic material,
  100 g di-ethylene-glycol-di-methyl-ether (M=134).
This further solution is mixed, in a ratio of 1:1 (wt. %), with the basic lacquer. After stirring for approximately 10 minutes, the lacquer is filtered over a 0.5 µm filter. The resultant solution (lacquer) comprises the following compounds in the following molar percentages:
  26 mol % methyl-tri-methoxysilane,
  15 mol % 3-glycidyloxy-propyl-tri-methoxysilane,
  59 mol % silicon-dioxide particles.
The resultant solution (lacquer) is subsequently spin-coated onto a flat substrate (display window) at 200 r.p.m., whereafter it is cured for 1 hour at 160° C. The coating thus obtained has a thickness of 4 µm. The coating formed is mirror-bright, neutral in color and exhibits an average transmission of 90±2% between 420 and 680 nm.

The thickness of the filter layer obtained is governed, inter alia, by the quantity of solvent and the speed (r.p.m.) with which the layer is provided by spin coating. The coating is resistant to washing with a weak acid, a weak base, ethanol, acetone, water and customary cleaning agents. The adhesion of the coating to the glass surface complies with the tape-test requirements.

In a scratch-resistance test in which a conical diamond (radius 8 µm) is moved over the surface of the coating with a force of 45 g, it is established that any scratches formed are invisible to the naked eye.

The abrasion-resistance of the coating is determined by rubbing one and the same surface of the coating twenty times over a length of 25 mm with a Lion 50—50 eraser with a force of 10 N. The outcome of the test is that hardly any scratches on the rubbed surface can be observed with the naked eye.

EXAMPLE 2

A solution is prepared, which comprises:
- 40 g ethanol (M=60),
- 100 g 3-glycidyloxy-propyl-tri-methoxysilane (M=236).

The following substance is stirred into this mixture:
- 9,4 g of a titanium-oxide-suspension of 15 wt. % $TiO_2$ in water (pH=0, particle size 20 nm).

After stirring for about 10 minutes, the following substance is added to this mixture:
- 7,5 g tetra-ethyl-ortho-titanate (M=228).

After stirring for about 20 minutes, the following substance is added to this mixture:
- 23.5 g of a titanium-oxide suspension of 15 wt. % $TiO_2$ in water (pH=0, particle size 20 nm).

The preparation of this basic lacquer takes approximately 30 minutes.

A further solution is prepared:
- 5 g photochromic material,
- 100 g di-ethylene-glycol-di-methyl-ether (M=134).

This further solution is mixed, in a ratio of 1:1 (wt. %), with the basic lacquer. After stirring for approximately 10 minutes, the lacquer is filtered over a 0.5 µm filter. The resultant solution (lacquer) comprises the following compounds in the following molar percentages:
- 82 mol % 3-glycidyloxy-propyl-tri-methoxysilane,
- 12 mol % titanium-oxide particles,
- 6 mol % tetra-ethyl-orthotitanate.

The resultant solution (lacquer) is subsequently spin-coated onto a flat display window at a speed of 200 r.p.m., whereafter it is cured for 1 hour at 80° C. The coating thus obtained has a thickness of 4 µm. The coating formed is mirror-bright, neutral in color and exhibits an average transmission of 90±3% between 420 and 680 nm. Scratch-resistance tests reveal that hardly any scratches on the rubbed surface are visible to the naked eye.

It will be obvious that within the scope of the invention many variations are possible to those skilled in the art.

For example, by using conductive metaloxides, the coating can be rendered anti-static. It is also possible to add extra (blackening) dyes to the solution. For this purpose use can be made of both inorganic pigments and organic dyes.

In general, the invention relates to an optical element comprising a substrate which is provided with a transparent coating (9) containing a photochromic material, the transmission of said optical element varying in the visible region in response to a variation in light. The optical element is characterized in that the coating (9) comprises an inorganic network of a silicon oxide and an organic (carbon-containing) polymer which is chemically bonded to the inorganic network via Si—C bonds. Preferably, also microscopic particles of a metal oxide are incorporated in the network, the metal preferably being selected from the group formed by Al, Si, Ti, Zr, In and Sn. Preferably, metal-oxide particles are used whose size is above 5 nm. Such photochromic coatings (9) are scratch-resistant and demonstrate a good switching behavior. The coatings are used, for example, on display windows (3) of display devices and on sunglasses. Methods of manufacturing said layers are described.

What is claimed is:

1. An optical element comprising a substrate provided with a transparent coating containing a photochromic material, the transmission of said optical element in the visible range varying in response to a variation in light, characterized in that the coating comprises a hybrid network comprising a silicon oxide having an —O—Si—O— network and an organic polymer chemically bonded to the —O—Si—O— network via Si—C bonds, and that microscopic particles of a metal oxide are incorporated into the hybrid network, at least some of which particles are chemically bound and intertwined with the hybrid network via —Si—O— bonds.

2. An optical element as claimed in claim 1, characterized in that the metal in the metal oxide is selected from the group consisting of Al, Si, Ti, Zr, In and Sn.

3. An optical element as claimed in claim 1, characterized in that the fraction by volume of the microscopic particles in the coating ranges from 1 to 35%.

4. An optical element as claimed in claim 1, characterized in that the size of the microscopic particles is above 5 nm.

5. An optical element as claimed in claim 1, characterized in that the size of the microscopic particles is below 200 nm.

6. An optical element as claimed in claim 1 characterized in that the coating has a thickness of from 0.5 to 20 µm.

7. A display device comprising a display window (3) which serves as the substrate of an optical element as claimed in claim 1.

8. An optical element as claimed in claim 6, characterized in that the metal in the metal oxide is selected from the group consisting of Al, Si, Ti, Zr, In, and Sn.

* * * * *